UNITED STATES PATENT OFFICE.

ALBERT I. FERGUSON, OF SHARON, PENNSYLVANIA.

IMPROVED PROCESS OF RECUTTING FILES.

Specification forming part of Letters Patent No. 73,590, dated January 21, 1868.

*To all whom it may concern:*

Be it known that I, ALBERT I. FERGUSON, of Sharon, in the county of Mercer and State of Pennsylvania, have invented certain new and useful Improvements in the Process of Recutting Files; and I do hereby declare that the following is a full, clear, and exact description thereof, reference being had to the accompanying drawings, and to the letters of reference marked thereon, which form a part of this specification.

In preparing old files for recutting, the following process is to be observed: First, the files must be thoroughly cleansed in warm water containing a small quantity of potash, which readily removes any grease or dirt from them. After the files are thus cleansed they must be washed with warm water and dried by artificial heat. Next, place one pint of warm water into a wooden vessel and put into it as many files as the water will cover; then add two ounces of blue vitriol, finely pulverized, and two ounces of borax, well mixed, taking care to turn the files over so that each may come in contact with the mixture. To the above mixture now add seven ounces of sulphuric acid and one-fourth of an ounce of cider vinegar, which will cause the files to assume a red appearance at first, but they will in a short time assume their natural color; then they must be removed, washed in cold water, and then dried by artificial heat. When dry they must be sponged with olive-oil, wrapped in porous paper, and laid aside for use.

Having thus described my invention, what I claim, and desire to secure by Letters Patent, is—

The combination of the within-described ingredients, when used for recutting files, substantially in the manner herein specified.

In testimony that I claim the foregoing as my own I affix my signature in presence of two witnesses.

ALBERT I. FERGUSON.

Witnesses:
   A. B. LOGAN,
   N. S. WILLIAMS.